US012683097B2

(12) United States Patent
Lantz et al.

(10) Patent No.: US 12,683,097 B2
(45) Date of Patent: Jul. 14, 2026

(54) DEVICE FOR EXTINGUISHING ARCS IN AN ELECTRICAL CIRCUIT

(71) Applicant: ABB Schweiz AG, Baden (CH)

(72) Inventors: Gabriel Lantz, Zurich (CH); Matthias Bator, Klettgau (DE); Julien Rault, Bern (CH)

(73) Assignee: ABB Schweiz AG, Baden (CH)

( * ) Notice: Subject to any disclaimer, the term of this patent is extended or adjusted under 35 U.S.C. 154(b) by 269 days.

(21) Appl. No.: 18/404,007

(22) Filed: Jan. 4, 2024

(65) Prior Publication Data

US 2024/0222043 A1 Jul. 4, 2024

(30) Foreign Application Priority Data

Jan. 4, 2023 (EP) .................................... 23150343

(51) Int. Cl.
*H01H 9/36* (2006.01)
*H01H 9/32* (2006.01)
*H01H 9/34* (2006.01)

(52) U.S. Cl.
CPC .............. *H01H 9/362* (2013.01); *H01H 9/32* (2013.01); *H01H 9/342* (2013.01); *H01H 9/346* (2013.01)

(58) Field of Classification Search
CPC .. H01H 9/30; H01H 9/32; H01H 9/34; H01H 9/342; H01H 9/345; H01H 9/346; H01H 9/46; H01H 9/362
USPC .... 218/149, 15, 29, 34, 38, 46, 47, 81, 103, 218/105, 156
See application file for complete search history.

(56) References Cited

U.S. PATENT DOCUMENTS

| | | | | |
|---|---|---|---|---|
| 4,011,425 A * | 3/1977 | Gryctko | H01H 9/36 218/15 |
| 6,207,916 B1 | 3/2001 | Pniok et al. | |
| 10,692,671 B2 * | 6/2020 | Kralik | H01H 9/346 |
| 2003/0117246 A1 * | 6/2003 | Baiatu | H01H 73/18 335/16 |
| 2016/0181034 A1 * | 6/2016 | Vallier | H01H 33/08 218/148 |

FOREIGN PATENT DOCUMENTS

| | | |
|---|---|---|
| EP | 1251532 A2 | 10/2002 |
| JP | 55-144616 A | 11/1980 |
| JP | 61-248324 A | 11/1986 |
| JP | 61-248325 A | 11/1986 |

OTHER PUBLICATIONS

European Patent Office, Extended European Search Report in European Patent Application No. 23150343.4, 9 pp. (Jul. 3, 2023).

* cited by examiner

*Primary Examiner* — William A Bolton
(74) *Attorney, Agent, or Firm* — Fitch Even Tabin & Flannery LLP

(57) ABSTRACT

A device for extinguishing arcs in an electrical circuit includes a first arc chamber configured to divide a first part of an arc into a plurality of subsidiary arcs, a second arc chamber configured to divide a second part of the arc into a plurality of subsidiary arcs; wherein the first arc chamber and the second arc chamber are connected by a connection element configured to guide the second part of the arc from the first arc chamber to the second arc chamber.

12 Claims, 1 Drawing Sheet

DEVICE FOR EXTINGUISHING ARCS IN AN ELECTRICAL CIRCUIT

CROSS-REFERENCE TO RELATED APPLICATIONS

The instant application claims priority to European Patent Application No. 23150343.4, filed Jan. 4, 2023, which is incorporated herein in its entirety by reference.

FIELD OF THE DISCLOSURE

The present disclosure relates to a device for extinguishing arcs in an electrical circuit and, more specifically, to a system and a use of such a device or such a system for extinguishing an arc in an electrical circuit.

BACKGROUND OF THE INVENTION

Arc chambers are known from the state of the art. Arc chambers are used to extinguish an arc in electrical circuits, e.g. originated by opening a contact system in an electrical circuit. With an increasing arc voltage, the requirements for arc chambers or corresponding devices for extinguishing arcs also increase.

It has now become apparent that there is a further need to provide a device for extinguishing arcs with an increased performance.

BRIEF SUMMARY OF THE INVENTION

The present disclosure describes a device that allows extinguishing arcs with an increased performance. In one embodiment, a system and method is provided for extending the voltage range of compact breakers. When opening a contact system in an electrical circuit, an arc originates. In dependency of the voltage level in the electrical circuit the arc chamber has to be configured to extinguish the arc. Embodiments in accordance with the disclosure involve use of two or more arc chambers arranged adjacent to each other instead of using one single arc chamber.

In one aspect of the present disclosure a device for extinguishing arcs in an electrical circuit is provided, comprising: a first arc chamber configured to divide a first part of an arc into a plurality of subsidiary arcs, and a second arc chamber configured to divide a second part of the arc into a plurality of subsidiary arcs; wherein the first arc chamber and the second arc chamber are connected by a connection element configured to guide the second part of the arc from the first arc chamber to the second arc chamber.

BRIEF DESCRIPTION OF THE SEVERAL VIEWS OF THE DRAWING(S)

DETAILED DESCRIPTION OF THE INVENTION

Figure 1:
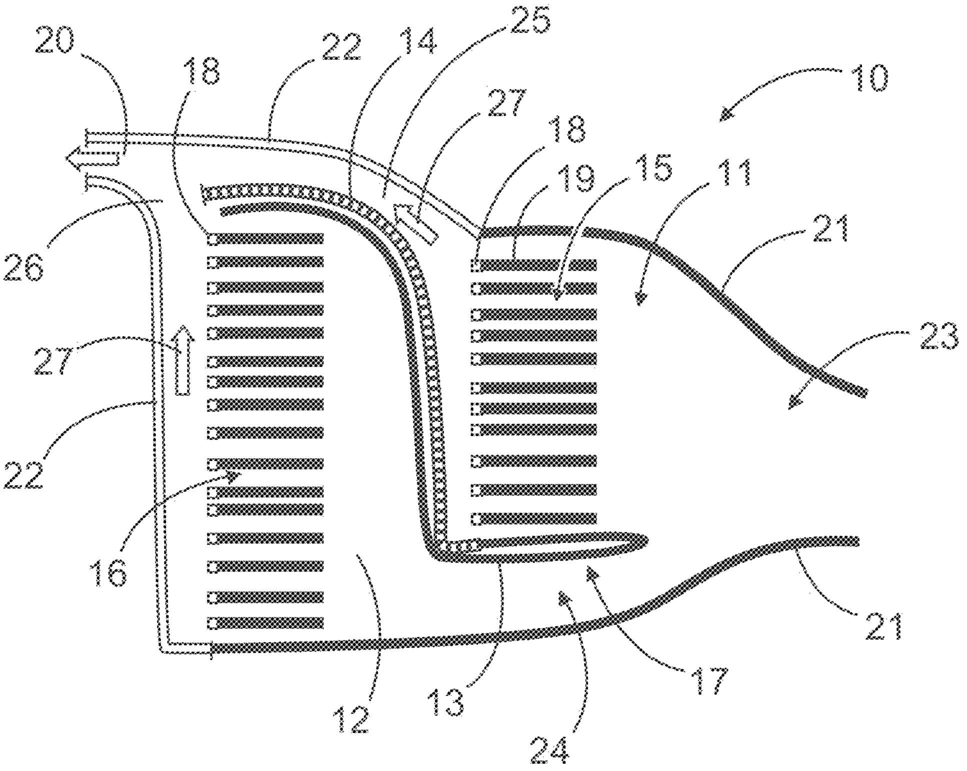
FIG. 1 is a schematic diagram of an example device for extinguishing arcs in an electrical circuit in accordance with the disclosure.

FIG. 1 shows a schematic illustration of an example device 10 for extinguishing arcs in an electrical circuit. The device 10 comprises a first arc chamber 11 configured to divide a first part of an arc into a plurality of subsidiary arcs and a second arc chamber 12 configured to divide a second part of the arc into a plurality of subsidiary arcs.

The first arc chamber 11 and the second arc chamber 12 are connected by a connection element 13 configured to guide the second part of the arc from the first arc chamber 11 to the second arc chamber 12.

The connection element 11 may be a splitter plate. The splitter plate may protrude from the first arc chamber 11 to the second arc chamber 12. The connection element 13 may be a double curved splitter plate 17.

The first arc chamber 11 and the second arc chamber 12 may be insulated electrically except via the connection element 13. The first arc chamber 11 and the second arc chamber 12 may be insulated from each other by an insulator 14.

The first arc chamber 11 may comprise a plurality of splitter plates 15. The second arc chamber 12 may comprise a plurality of splitter plates 16. The plurality of splitter plates 15 and 16 may comprise at least one splitter plate, preferably at least 5 splitter plates, most preferably at least 10 splitter plates.

Each of the plurality of splitter plates 15 in the first arc chamber 11 and each of the plurality of splitter plates 16 in the second arc chamber 12 may comprise an insulator 18 attached at the end to the splitter plate. The insulator 18 may be made of plastic material. Each splitter plate may comprise a metal part 19.

The first arc chamber 11 and the second arc chamber 12 may be arranged adjacent to each other and preferably in series to each other. The second arc chamber 12 may be configured to be detachably connected to the first arc chamber 11.

The device 10 may comprise at least one exhaust 20 configured to allow gas originated due to the arc to exit the first arc chamber 11 and second arc chamber 12.

The device 10 may comprise a metal wall 21, also known as rail, configured to guide an arc into the first arc chamber 11 and the second arc chamber 12. The device may 10 may comprise an insulator wall 22 made of plastic.

An arc may be driven by a Lorentz force through an opening 23 of device 10 into the first arc chamber 11. A second part of an arc may be guided through a second opening 24 to the second arc chamber 12.

The second opening 24 may be formed by the metal wall 21 and the connection element 13. The gas originated due to the arc extinguishing may outflow from the first arc chamber through a channel 25 formed by the insulator 14 and the insulator wall 22. The gas originated due to the arc extinguishing may outflow from the second arc chamber 11 through an opening 26. The arrows 27 represent a flow direction of the gas.

Figure 2:
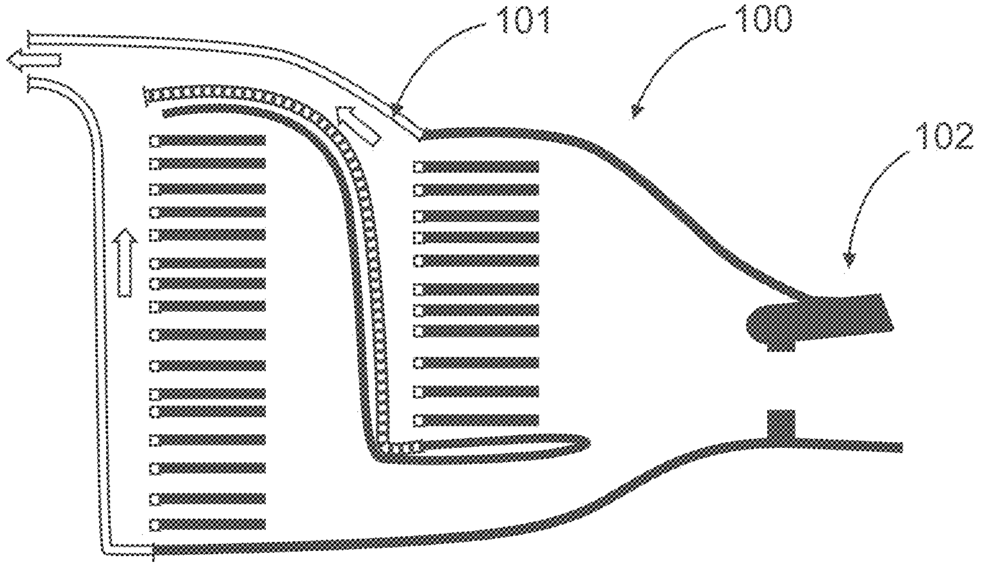
FIG. 2 is a schematic diagram of an example system for extinguishing arcs in an electrical circuit in accordance with the disclosure.

FIG. 2 shows a schematic illustration of an example system 100 for extinguishing arcs in an electrical circuit. The system comprises a device 101 for extinguishing arcs in an electrical circuit as described in FIG. 1 and a single contact system 102 for opening an electrical circuit. The electrical circuit may be a DC circuit. The single contact system 102 is shown in an open state. Due to an opening of the contact system, a switch arc may be originated. The device 101 may extinguish the arc in a save and fast manner.

The devices 10 and/or 101 in accordance with the disclosure may increase an arc voltage. The series of arc chambers may allow to use the space behind the standard arc chamber (that may often be the direction easiest to extend the devices size) to increase the arc voltage. Other solutions may comprise increasing the size of the standard arc chamber vertically, which may be a highly restricted direction.

With the previously described need to go to higher arcing voltages when the DC system voltage increases, comes the question how to enable devices to reach these higher voltages. There are different possibilities to solve the problem.

A first possibility is to increase the size of the arc chamber in stacking direction of the plates. This may bring the advantage of simple scalability, but is very often limited realistically by external constraints such as the size, or more often, by the opening angle of the contact which may need to ideally cover the full height of the splitter plate pack to be most efficient.

A second possibility is to connect several devices or separate poles of a single device in series. While this may have the advantage of utilizing existing structures, high voltages would require the need to serialize many chambers, every additional chamber may add contact resistances due to replicating everything in a breaker and it may add uncertainty and reliability problems, as each separate pole has to be interrupted. A failure or e.g. problem of opening in a pole can jeopardize the whole interruption.

The embodiments in accordance with the disclosure may incorporate an extension behind (in flow direction of the hot gases from contact system towards exhaust) the standard arc chamber, e.g., in front of the arc chambers exhaust. This may have the advantage that ideally no or very small changes to the existing contact geometry need to be done as the opening angle still will be sufficient to cover the whole arc chamber. Furthermore, the needed changes to the existing arc chamber may be minimal with the main change being for example, the implementation of a also referred to as rail structure extending the bottom-most splitter-plate to either above or directly to the topmost splitter plate of the second arc chamber to allow correct positioning of the arc.

Theoretically, this system may not be restricted to two arc chambers in series and in fact could be even scalable with current, where the magnetic and flow forces for smaller currents would only utilize e.g. the first chamber, while higher currents and resulting larger forces would push the arc further down the series of arc chambers more efficiently. Exhausts can be arranged by need, allowing to either implement partial exhausts per arc chamber or use a single exhaust behind the last arcing chamber as the exclusive opening.

As described previously, this may also be the direction where an extension of the devices is easier to implement compared to extending the arc chamber in stacking direction of the separate plates.

The additional arc chamber may be connected to the first arc chamber by replacing the splitter plate nearest to the rail by a double curved splitter plate that is elongated to serve as a rail for the second arc chamber. This splitter plate may extend to the second arc chamber and splitter plates may be inserted between the bottom rail connected to the fixed contact and this elongated splitter plate. The advantage may be that no additional moving parts are necessary and that the additional arc chamber could be a modular add on and may be used only as an option when higher voltage ratings are needed.

The term arc, as used herein, is to be understood broadly and may relate to an electrical arc originated by opening a contact system of an electrical circuit. The electrical arc may relate to a plasma originated by opening a contact system of an electrical circuit. The plasma comprises ionized atoms that carry electrical current. The arc may be divided in a first part and in a second part, wherein each part may be divided into a plurality of subsidiary arcs.

The term extinguishing, as used herein, is to be understood broadly and may relate to cooling down the arc, in particular the hot plasma, and thereby the arc stopping to carry the current, as the atoms of the arc not ionized anymore. The extinguishing may comprise dividing an arc into a plurality of subsidiary arcs. The extinguishing may comprise a reduction of the temperature caused by the arc.

The term electrical circuit, as used herein, is to be understood broadly and may relate to any electrical circuit of an electrical system, e.g. of a battery system, switch box, etc. The electrical circuit may be an AC circuit or a DC circuit. The electrical circuit may be a high voltage circuit, a medium voltage circuit or a low voltage circuit.

The term arc chamber, as used herein, is to be understood broadly and may relate to a chamber configured to at least partially extinguish arcs. The arc chamber may comprise an opening configured to allow an arc to be guided into the arc chamber. The arc chamber may be configured to divide an arc into a plurality of subsidiary arcs.

The term connection element, as used herein, is to be understood broadly and may relate to any structural element configured to guide at least a part of an arc from an arc chamber to another arc chamber. The connection element may comprise a metal (i.e. conductive material).

As mentioned above, the claimed solution makes use of the finding that with an increasing arc voltage the requirements on a capacity of a device for extinguishing an arc also increase. This is normally achieved by constructing a device comprising an arc chamber with an increased volume. The disclosure proposes instead to use a device comprising two arc chambers that are connected in order to increase the performance of the device. This may be advantageous regarding required space, flexibility of used space and flexibility of arrangement of arc chambers in such a device and expandability of such a device.

In other words, the basic idea of the disclosure may entail proposing an extension of a second arc chamber behind a first arc chamber. This may have the advantage that ideally no or only very small changes to an existing geometry of a contact system need to be made as an opening angle of the existing geometry of the contact system may be sufficient to cover the arc chamber, in particular the first arc chamber and second arc chamber. The embodiments of the disclosure as proposed may advantageously not be restricted to a first arc chamber and second arc chamber. The proposed device may be scalable in dependency of the arc voltage. In case only a low arc voltage occurs, one arc chamber is sufficient, in case a higher arc voltage occurs a second or a third arc chamber may be assembled to meet the requirement for extinguishing the arc.

In an aspect of the present disclosure, the connection element may be a splitter plate that protrudes from the first arc chamber to the second arc chamber. In other words, the splitter plate may extend from the first arc chamber to the second arc chamber and may guide a second part of the arc to the second arc chamber. This may advantageously enable extinguishing the arc quickly.

In an aspect of the present disclosure, the first arc chamber and the second arc chamber may be insulated electrically from each other except via the connection element. This may be advantageous regarding the guiding of the arc in the first and second arc chamber. The insulation may be achieved by an insulator arranged between the first arc chamber and the second arc chamber. The insulator may be designed as a wall delimiting the first arc chamber from the second arc chamber. The insulator may be made from plastic.

In an aspect of the present disclosure, the connection element may be a double curved splitter plate. This may be advantageous regarding space saving and arc guidance. The term double curved splitter plate, as used herein, is to be understood broadly and may relate to a splitter plate configured to deflect an arc at least one time and thereby guiding a part of an arc from a first arc chamber to a second arc chamber. The double curved splitter plate may be realized by a conductive connection between a last splitter plate in the first arc chamber and a further splitter plate protruding from the first arc chamber into the second arc chamber, wherein the conductive connection is arranged at a front side of the last splitter plate and the further splitter plate. This may be advantageous, as it increases an efficiency for guiding or forcing a part of the arc from the first arc chamber into the second arc chamber. The double curved splitter plate may advantageously assist an Lorentz force to guide or force at least a part of the arc from the first arc chamber into the second arc chamber. The double curved splitter plate may relate to a splitter plate that is formed by a bending process such that in a side view a U-shape of the splitter plate is realized.

In an aspect of the present disclosure, the connection element may comprise a metal part and an insulator, wherein the insulator may isolate the first arc chamber from the second arc chamber. The insulator may advantageously prevent an arc from breaking through a housing of the arc chamber.

In an aspect of the present disclosure, the first arc chamber may comprise at least one splitter plate and the second arc chamber may comprise at least one splitter plate, wherein the at least one splitter plate of the first arc chamber and the at least one splitter plate of the second arc chamber may comprise each a metal part, and particularly wherein an insulator may be attached to the metal part. The at least one splitter plate may be configured separate may be configured to split an arc into subsidiary arcs.

In an aspect of the present disclosure, the first arc chamber and the second arc chamber may be arranged adjacent to each other. The term adjacent, as used herein, is to be understood broadly and may relate to an arrangement, wherein the second arc chamber may be arranged behind, over, below or diagonally offset with respect to the first arc chamber. These arrangements relate to an intended use of the device. The term behind may relate to a flow direction of the gas form the contact system towards the exhaust of the device, wherein the first arc chamber is arranged before the contact system and the second arc chamber behind the first arc chamber and before the exhaust. The adjacent arrangement of the first arc chamber and the second arc chamber may be advantageous in terms of space saving and flexibility.

In an aspect of the present disclosure, the first arc chamber and the second arc chamber may be arranged in series to each other. The term in series, as used herein, is to be understood broadly and may relate to any arrangement of the first arc chamber and the second arc chamber allowing the second part of the arc to be guided into the second arc chamber. The term in series may preferably relate to an arrangement of the second arc chamber behind the first arc chamber.

In an aspect of the present disclosure the device may comprise a third arc chamber connected by a further connection element configured to guide a third part of the arc from the second arc chamber to the third arc chamber. This may be advantageous regarding scalability of the device in case an arc with a higher voltage has to be extinguished. The device may be modularly expendable. The device may comprise a fourth arc chamber or more.

It should be noted that anything that applies for the second arc chamber also applies for the third arc chamber or any further arc chamber.

In an aspect of the present disclosure the second arc chamber may be configured to be detachably connected to the first arc chamber. This may be advantageous in terms of scalability.

In an aspect of the present disclosure the circuit may be a DC circuit.

In an aspect of the present disclosure the circuit may be an AC circuit.

In an aspect of the present disclosure the device may comprise at least one exhaust configured to allow gas originated due to the arc to exit the first and the second arc chamber. The arc consists of plasma, i.e. ionized gas, which has a high temperature. This high temperature gas exits the first and the second arc chamber via the at least one exhaust after the arc extinguished.

A further aspect of the present disclosure relates to a system, comprising: a device as described above and a contact system for opening an electrical circuit, wherein the contact system comprises a single contact system and/or a double contact system. The system may comprise a plurality of devices. A single contact system relates to system that comprises only one contact for opening or closing the electrical circuit. A double contact system relates to a system that comprises two contacts for opening or closing the electrical circuit.

Another aspect of the present disclosure relates to a use of a device described above and of a system described above for extinguishing an arc in an electrical circuit.

Any disclosure and embodiments described herein relate to the device and system lined out above and vice versa. Advantageously, the benefits provided by any of the embodiments and examples equally apply to all other embodiments and examples and vice versa.

REFERENCE SIGNS

10, 101 device
11 first arc chamber
12 second arc chamber
13 connection element
14 insulator
15, 16 plurality of splitter plates
17 double curved splitter plate
18 insulator
19 metal part
20 exhaust
21 metal wall
22 insulator wall
23 opening
24 second opening
25 channel
26 opening
27 flow direction
100 system
102 contact system All references, including publications, patent applications, and patents, cited herein are hereby incorporated by reference to the same extent as if each reference were individually and specifically indicated to be incorporated by reference and were set forth in its entirety herein.

The use of the terms “a” and “an” and “the” and “at least one” and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A device for extinguishing arcs in an electrical circuit, comprising:

a first arc chamber configured to divide a first part of an arc into a plurality of subsidiary arcs, a second arc chamber configured to divide a second part of the arc into a plurality of subsidiary arcs;

wherein the first arc chamber and the second arc chamber are connected by a connection element configured to guide the second part of the arc from the first arc chamber to the second arc chamber;

wherein the connection element is a double curved splitter plate that solely guides the second part of the arc; and wherein the double curved splitter plate comprises a u-shape in a side view.

2. The device according to claim 1, wherein the connection element is a splitter plate that protrudes from the first arc chamber to the second arc chamber.

3. The device according to claim 1, wherein the first arc chamber and the second arc chamber are insulated electrically from each other except via the connection element.

4. The device according to claim 1, wherein the connection element comprises a metal part and an insulator, wherein the insulator isolates the first arc chamber from the second arc chamber.

5. The device according to claim 1, wherein the first arc chamber comprises at least one splitter plate and the second arc chamber comprises at least one additional splitter plate, wherein each of the at least one splitter plate of the first arc chamber and the at least one additional splitter plate of the second arc chamber comprises a metal part.

6. The device according to claim 5, wherein an insulator is attached to each metal part.

7. The device according to claim 1, wherein the first arc chamber and the second arc chamber are arranged adjacent to each other.

8. The device according to claim 1, wherein the first arc chamber and the second arc chamber are arranged in series to each other.

9. The device according to claim 1, wherein the second arc chamber is configured to be detachable connected to the first arc chamber.

10. The device according to claim 1, wherein the circuit is a DC circuit.

11. The device according to claim 1, wherein the circuit is an AC circuit.

12. The device according to claim 1, further comprising at least one exhaust configured to allow gas originated due to the arc to exit the first arc chamber and the second arc chamber.

* * * * *